Jan. 29, 1963  R. AMSLER  3,075,409
STEPLESS MECHANICAL REDUCTION GEARING
Filed May 6, 1959  3 Sheets-Sheet 1

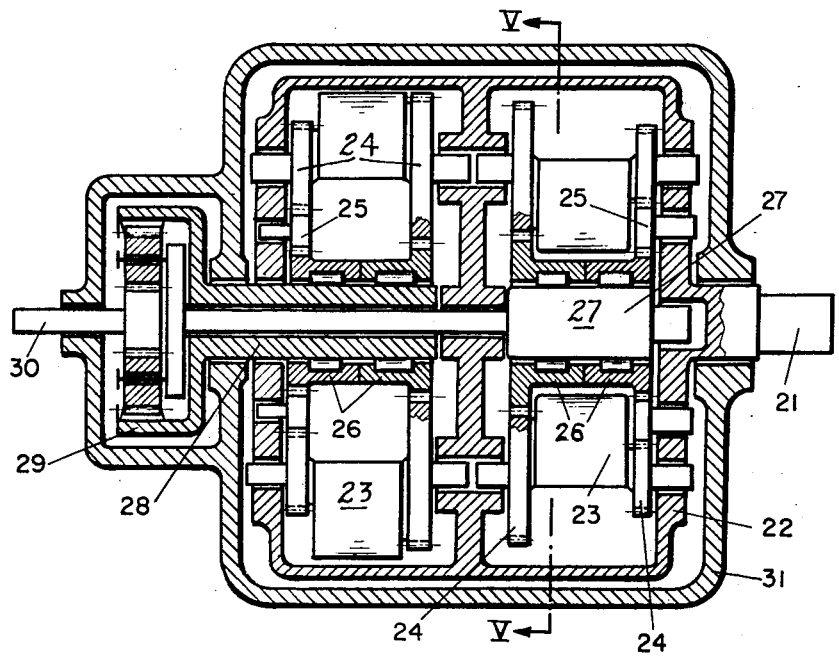
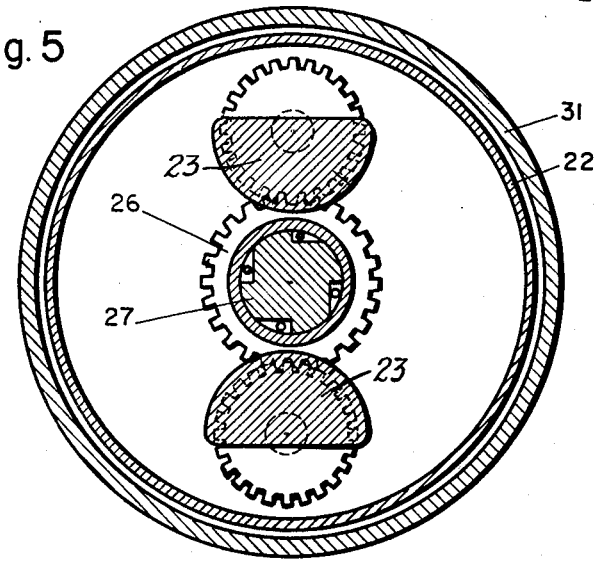

United States Patent Office 3,075,409
Patented Jan. 29, 1963

3,075,409
STEPLESS MECHANICAL REDUCTION GEARING
Rudolf Amsler, 124 Zentral Strasse, Neuhausen am Rheinfall, Switzerland
Filed May 6, 1959, Ser. No. 811,395
Claims priority, application Switzerland May 9, 1958
7 Claims. (Cl. 74—679)

The present invention relates to a stepless mechanical reduction gearing, and the main object is to provide a gearing which is capable of transforming a rotational movement automatically into a rotational movement at a ratio adapting itself to the torque imparted to it, without the use of a shifting- or adjusting mechanism.

With this and other objects in view which will become apparent later from this specification and accompanying drawings, I provide a method of steplessly transmitting a rotational movement at a ratio responsive to the applied torque, comprising the steps of generating by the input movement two periodical control movements mutually offset in phase at least approximately 90° transmitting the said control movements unidirectionally to summation means, and deriving a uniform continous rotational movement as the sum of the said control movements.

I also provide a stepless mechanical automatic reduction gearing comprising in combination: an input member, at least two aggregates each having at least one eccentrically mounted revolving mass the masses of the said aggregates being mutually offset substantially 90° in the sense of rotation, one-way clutches, each coupled with one of the said masses, at least one planet gearing coupled to the said one-way clutches, and an output member coupled to the said planet gearing, each of the said revolving masses forming part of an oscillating system transmitting oscillations through the said one-way clutches to the said planet gearing for summation.

These and other features of my said invention will be clearly understood from the follow description of three embodiments thereof given by way of example with reference to the accompanying drawings, in which:

FIG. 4 is a longitudinal section of a second embodiment, FIG. 5 is a cross sectional view taken on the line V—V of FIG. 4.

FIG. 6 shows another embodiment of the gearing in longitudinal section, while

Figure 1:
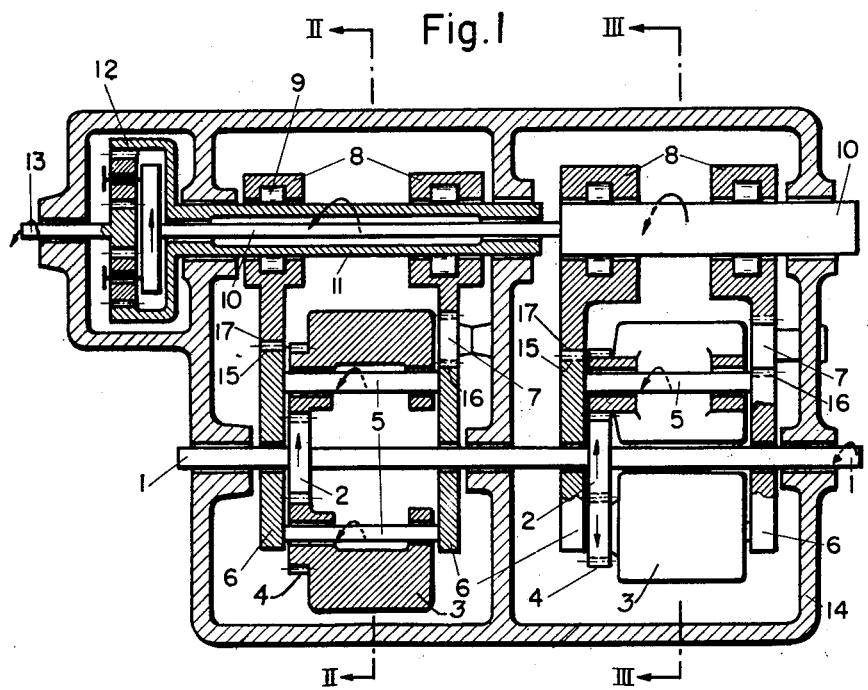
FIG. 1 is a longitudinal section of a first or preferred embodiment.
Figure 2:
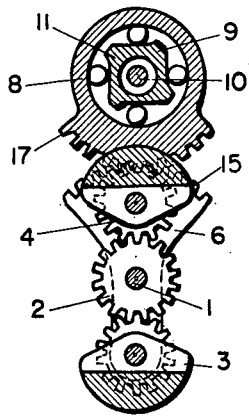
FIGS. 2 and 3 are cross sectional views taken on the lines II—II and III—III, respectively of FIG. 1.
Figure 3:
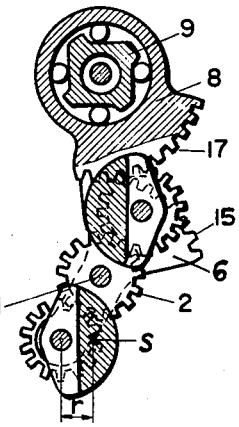

The gearing according to FIGS. 1 to 3 comprises a casing 14, which in the embodiment illustrated contains two identically constructed aggregates for gearing units. An input shaft 1 carrying two gears 2 fixedly attached to it for rotation and journalled in the casing 14 serves for driving both of said aggregates. On the said shaft 1 a pair of swinging members 6 are mounted idly, which are connected to one another in pairs, each pair by two parallel connecting axles 5. Two such swinging members 6 with their associated connecting axles 5 form one part of an oscillating system in each of the two aggregates. Fly weights 3 are mounted rotatably about the axles 5. These fly weights are each fixedly connected at one end face with a gear 4. The two gears 4 of each aggregate mesh with their associated gears 2. A rotation of the latter consequently involves turning of the fly weights 3 about the axles 5. As diagrammatically indicated in the drawing, the fly weights of each aggregate are offset 180° with respect to one another. The fly weights of each aggregate are arranged offset 90° relative to the adjacent fly weights of the other aggregate.

The swinging members 6 each have a series of gear teeth, 15 and 16 respectively. The gear teeth 15 mesh with a toothed segment 17 of an outer ring 8 of a freewheel control clutch 9. The inner ring 18 of this clutch is mounted on a shaft 10 restrained from rotating relative to it (right hand side aggregate in FIG. 1), or on the outer shaft 11 (left hand side aggregate in FIG. 1), respectively.

The gear teeth of the right hand side swinging members 6 (FIG. 1) do not mesh directly with the outer rings 8 of their associated couplings 9, but each through an intermediate gear 7.

As will be seen from the FIGS. 2 and 3, the couplings 9 of the two aggregates are designed in such a manner, that the shafts 10 and 11, respectively, are turned in the opposite sense. The directions of rotation are indicated by the arrows drawn in FIG. 1. The two shafts 10, 11 are connected to and act on a planet gearing 12. The output shaft of the latter is denoted 13.

The drive is effected through the shaft 1 and the gears 2, which latter set the fly weights 3 in rotation. Upon rotation of the fly weights 3 the centrifugal forces in respect of the shaft 1 vary in such a manner that they set the oscillating system into sinusoidal oscillations, the frequency of which is equal to the rotational speed of the fly weights, and the frequency of which depends on the radius $r$ of the distance of the centre of gravity S of the fly weights of the masses, which are moved to-and-fro, and on the damping thereof, which acts counter to the oscillatory motion. The fly weights 3 of the two oscillatory systems are, as mentioned hereinabove, arranged in such a manner that the two oscillatory movements are offset 90° in phase. By the oscillatory movements of the oscillatory systems the shafts 10 and 11 are each set through a freewheel clutch 9 in a continuous sinusoidal rotary movement, which movements are combined in the planet gearing 12 and yield a continuous output speed of rotation of the output shaft 13.

Depending on the torque resistance applied to the output shaft, the amplitude of the oscillatory movement of the oscillatory systems adjusts itself. With increasing torque the amplitude decreases, and with decreasing torque it increases. Accordingly the rotational speed of the output shaft 13 diminishes or increases, i.e. the rotational output speed adapts itself automatically to the troque resistance imparted to it, without any alteration in the rotational input speed of the shaft 1.

Likewise the power output remains approximately constant over a large range of rotational speeds. At zero rotational output speed the torque is a maximum, but the power input of the driving motor is zero.

When quite definite rotational output speeds are required, the two oscillatory systems are replaced by adjustable eccentrics, which transmit their eccentrical movement to the free wheel control couplings.

In the embodiment described the graph of the periodical control movements in the speed-time diagram is sinusoidal. This need not absolutely be the case. Even a sinelike diagram would be sufficient. It is, however, of a considerable advantage, when in the afore-said speed-time diagram the ascending and descending branches of the graph are symmetrical to the speed axis, or to ordinates running parallel thereto.

While in the embodiment described each aggregate has two revolving masses 3, it would also be possible to provide one or more than two masses in each aggregate.

Instead of generating periodical control movements by revolving masses, alternatively rigid, mechanical, hydraulic, electric or pneumatical means may be provided.

As an example of mechanical means e.g. cam discs or elliptic discs may be mentioned.

The input movement may be either uniform or non-uniform.

The gearing described may be used with advantage for the transmission of the engine power of motor vehicles to the driven wheels.

The transmission gearing according to the modified embodiment of FIGS. 4 and 5 constitutes strictly speaking a constructional reversal of the embodiment according to the FIGS. 1 to 3, whereby a more compact design, or with the same structural volume a greater power can be attained. The drive is effected through a rotary casing 22, which is fixedly connected to the input shaft 21 and is rotatably journalled in the stationary casing 31. In the rotary casing 22 two groups of swinging elements are pivotally mounted which consist each of one or more fly weights 23. These two groups, arranged offset 90° relative to one another, each form an oscillatory system. To the fly weights 23 gears 24 are fixedly attached, which mesh with the toothed outer rings 26 of the freewheel couplings directly or through intermediate gears 25, respectively. Upon rotation of the rotary casing 22 the fly weights 23 are likewise set in rotation, and thereby generate a periodical oscillatory movement of the outer rings 26 of the freewheel clutches, which transmits the same as a progressive periodical movement to the shafts 27 and 28.

In the planet gearing 29 these two periodical rotational movements, which are mutually offset 90°, are added to one another and transformed into a uniform rotational movement, so that the output shaft 30 performs a uniform continuous rotational movement. The rotational speed of the output shaft 30 depends, assuming a constant rotational speed of the shaft 21, on the amplitude of the outer rings 26 of the freewheel clutches, and the latter depends on the resistance opposed to the oscillation by the torque imparted to the output shaft.

Instead of a rotary casing a rotary frame or the like may be provided.

Figure 6:
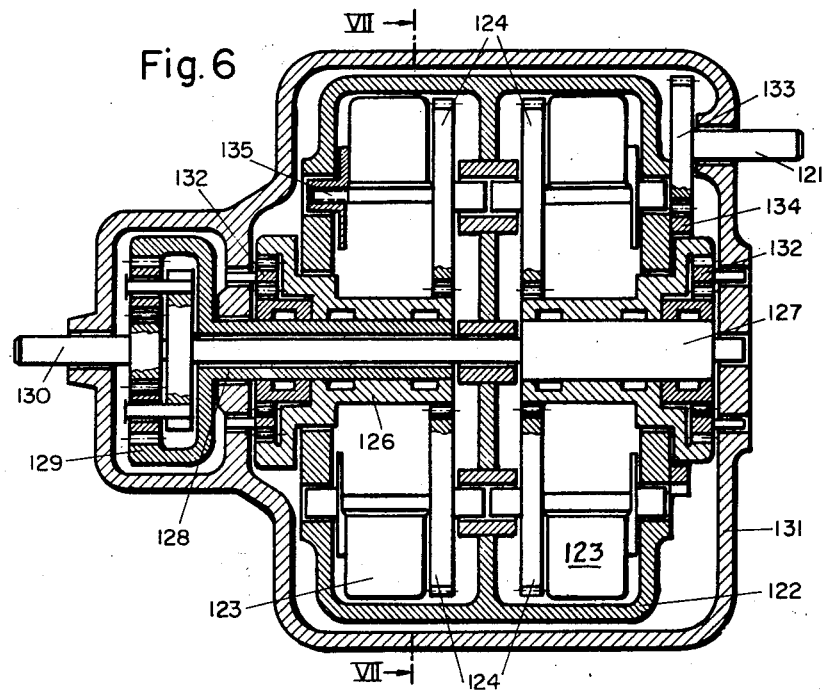
Figure 7:
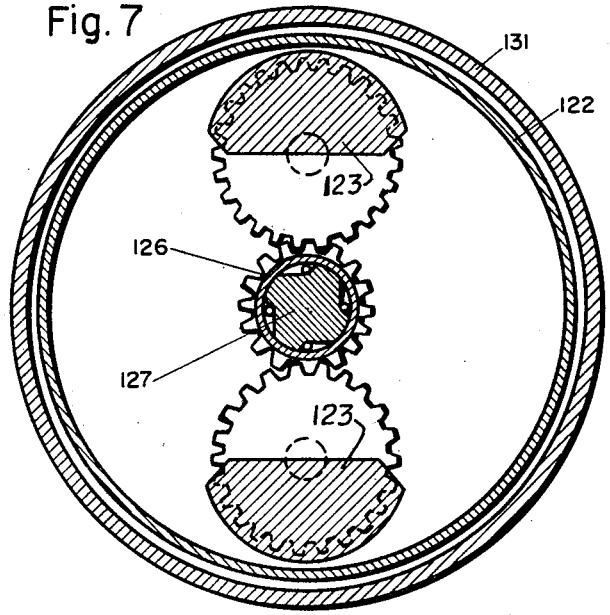
FIG. 7 is a cross sectional view taken on the line VII—VII of FIG. 1.

In the embodiment according to the FIGS. 6 and 7 in the stationary gearing casing 131 the rotary casing 122 is journalled and freely rotatable therein, as described for the second embodiment according to FIG. 4, and in the present embodiment is driven by the input shaft 121 through suitable gearing 133, 134. Otherwise the components 123, 124, 126, 127, 128, 129, 130 correspond to the components 23, 24, 26, 27, 28, 29 and 30 of the FIGS. 4 and 5, and need not here be described again as regards their function. Merely the reversal of the sense of rotation of the oscillations is here effected by gears 132, which correspond in their action to the gears 25 of FIG. 4.

The shafts 135 of the fly weights 123 may be designed in this embodiment as torsion bars.

While I have described herein and illustrated in the accompanying drawings what may be described as typical and particularly useful embodiments of my said invention I wish it to be understood that I do not limit myself to the particular details and dimensions described and illustrated for obvious modifications will occur to a person skilled in the art.

What I claim as my invention and desire to secure by Letters Patent, is:

1. In an automatic reduction gearing, comprising a drive shaft, a driven shaft, said drive and driven shafts being arranged in parallel relation, a pair of weighted gear units arranged in side by side relation, gearing connected to said drive shaft for rotating said weighted gear units, inner countershaft means, outer countershaft means, said countershafts being arranged to extend parallel with said drive shaft one way clutch means drivingly connecting each of said weighted gear units with said inner and outer counter shafts, planetary gearing coupling said inner and outer shafts including a ring gear carried by the outer shaft and planetary gears carried by the inner shaft drivingly engaging a sun gear, said sun gear being connected to said driving shaft, the weighted gear means of each unit being mutually and angularly displaced a distance of approximately 90° to dampen vibrations set up by said two units.

2. In an automatic reduction gearing, comprising a drive shaft, a driven shaft, a pair of transmission units arranged in side by side relation for drivingly connecting said drive shaft to said driven shaft at various speed ratios depending upon the torque applied to said driven shaft, each of said transmission units being provided with weighted gear members with the weighted gear members of one unit angularly displaced approximately 90° from the weighted gear members of the adjacent unit, an inner countershaft, an outer countershaft, a one way clutch drivingly connecting the weighted gear members of one of said units to one of said countershafts, one way clutch means drivingly connecting the other weighted gear members to the other of said countershafts, a ring gear secured to the outer shaft, planetary gears carried by the other countershaft, and a sun gear adapted to be driven by said planetary gears drivingly connected to said driven shaft.

3. An automatic reduction gearing as set forth in claim 2 in which said inner and outer countershafts are driven in opposite directions such that said driven shaft will be rotated at a speed equal to the summation of rotary movement imparted to said countershafts.

4. An automatic reduction gearing, comprising a drive shaft a driven shaft, a gear casing having a partition to provide a pair of separate chambers arranged in side by side relation, an impulse transmission unit mounted in each of said chambers and including weighted gear members with the weighted gear members of each unit driven by said drive shaft and arranged so that the weighted gear members of one unit are out of phase with the weighted gear units of the adjacent unit, an inner countershaft, an outer countershaft, said countershaft being journaled in said casing, one way clutch means drivingly connecting the weighted gear members on one unit with the inner counter shaft to rotate the same in one direction, one way clutch means drivingly connecting the weighted gear members of the other transmission unit to the outer countershaft to rotate the same in an opposite direction, a planetary ring gear secured to said outer shaft and planetary gears carried by the inner shaft, and a sun gear between said ring gear and planetary gears connected to said driven shaft whereby the impulses set up by said rotary weighted gear members will drive said driven shaft at a reduced speed and proportionate to the load ratio imposed on said driven shaft.

5. An automatic reduction gearing, comprising a gear casing having co-axially arranged drive and driven shafts, a reduction gear housing rotatably mounted in said casing having a partition dividing said housing into separate parts, an impulse unit mounted in each compartment, each impulse unit including rotary weighted gear bodies adapted to be driven by said driven housing, inner and outer shafts in said gear casing, one way clutch elements arranged to drive said shafts upon rotary movement of the weighted gear bodies in each of said compartments, idler gears drivingly connecting said weighted gear bodies to said one way clutch means, the weighted gear bodies of each unit being angularly displaced approximately 90° to dampen vibration set up by said gear bodies, a planetary ring gear on said outer shaft, planetary gears connected to said inner shaft and a sun gear drivingly engaged by said planetary gears and drivingly connecting said driven shaft, said inner and outer shafts being adapted to be driven in opposite directions by the weighted gear bodies of the respective units.

6. In an automatic speed reduction gearing, a gear housing, a casing rotatably mounted in said housing having separate compartments, an impulse transmission unit mounted in each compartment including weighted gear bodies rotatably mounted in said casing, drive and driven shafts in said housing, said drive shaft being drivingly connected to said transmission units with the drive shaft extending into said gear housing for driving said rotary casing and rotating the weighted gear bodies of each impulse unit about the axis of said drive shaft, coaxial inner and outer countershafts extending through said gear housing and casing in axial alignment with said drive shaft, one way clutch means drivingly connecting the rotary gear weighted bodies of one unit with the inner shaft to rotate the same in one direction, another one way clutch means drivingly connecting the weighted gear bodies of the other impulse unit to the outer shaft to rotate the same in an opposite direction, a planetary gear ring connected to said outer shaft, planetary gears connected to said inner shaft, and a sun gear engaged by said planetary gears and connected to the driven shaft.

7. In a variable speed power transmission, a transmission housing, a drive shaft projecting into one end of said housing, a driven shaft extending through the other end of said housing, a pair of transmission units in said housing, means drivingly connecting said drive shaft to said transmission units, each transmission unit including weighted gear members arranged in pairs with the weighted gear members of one transmission unit angularly displaced 180° from one another and displaced an angular distance of 90° from the weighted gear members of the adjacent transmission unit, an inner countershaft, an outer countershaft, said countershafts being mounted in said casing, clutch means drivingly connecting one of the transmission units to the inner countershaft, clutch means drivingly connecting the other transmission unit to the outer countershaft whereby impulses set up by the weighted gear members will impart rotary motion to the inner and outer countershafts in opposite directions, planetary gears connected with one end of said inner shaft, a ring gear connected with the outer shaft and in driving engagement with said planetary gears, and a sun gear drivingly engaged by said planetary gears and connected to the driven shaft.

References Cited in the file of this patent

UNITED STATES PATENTS

| | | |
|---|---|---|
| 1,685,371 | Nichols | Sept. 25, 1928 |
| 1,810,282 | Ljungstrom | June 16, 1931 |
| 2,038,959 | Sartakoff | Apr. 28, 1936 |
| 2,149,560 | Teece et al. | Mar. 7, 1939 |
| 2,290,293 | Porter | July 21, 1942 |
| 2,453,577 | Krispis | Nov. 9, 1948 |
| 2,881,642 | Dodge | Apr. 14, 1959 |

FOREIGN PATENTS

| | | |
|---|---|---|
| 502,399 | Great Britain | Mar. 10, 1939 |